Jan. 17, 1928.

W. S. GOULET 1,656,517

BRUSH CUTTING MACHINE

Filed May 9, 1923

Inventor

William S. Goulet by H. J. S. Dennison atty.

Patented Jan. 17, 1928.

1,656,517

UNITED STATES PATENT OFFICE.

WILLIAM S. GOULET, OF WAINWRIGHT, ALBERTA, CANADA.

BRUSH-CUTTING MACHINE.

Application filed May 9, 1923. Serial No. 637,834.

The principal objects of the invention are, to enable the rapid and effective clearing of brush covered tracts of land at a moderate cost, and to devise a machine which will effectively cut a wide swath through the brush.

The principal feature of the invention consists in the arrangement of a rapidly revolving cutter upon a wheeled support in an angular position sloping outwardly from the forward end, the cutter frame being adjustable on its wheeled supports.

In the drawings, Figure 1 is a perspective view of the invention.

Figure 1:
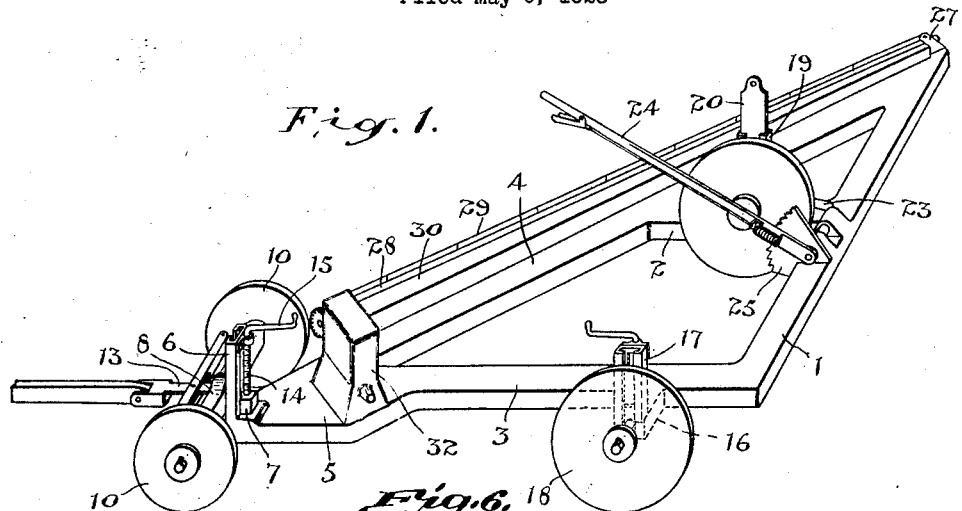
Figure 6:
Figure 6 is a detail view of the tapered rotary cutter member.
Figures 2, 3:
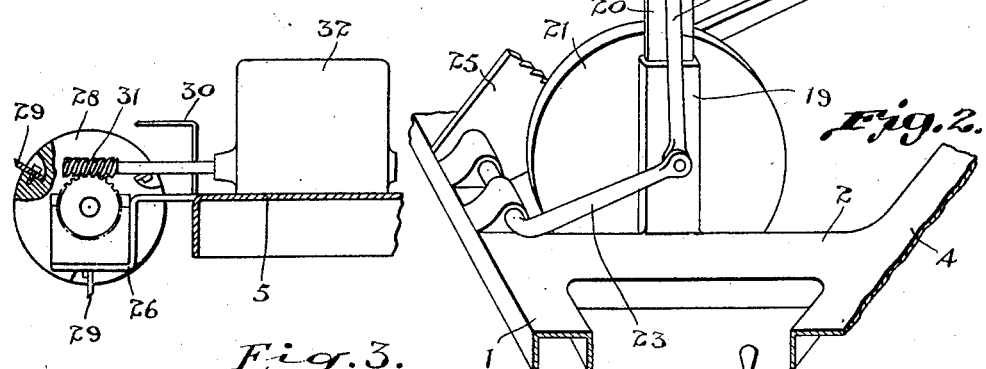
Figure 2 is an enlarged detail of one of the wheel supports.
Figure 3 is an enlarged end elevation of the cutter and its drive.
Figure 4:
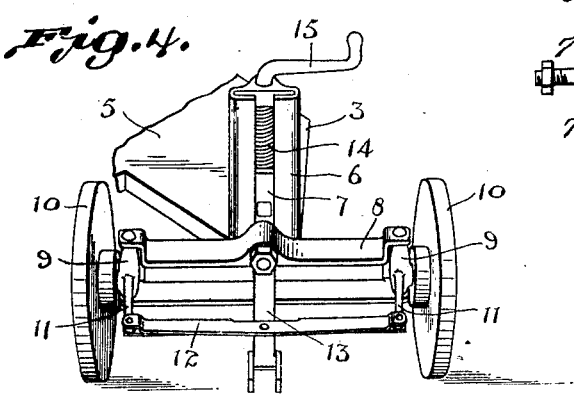
Figure 4 is a perspective view of the front wheel supports.
Figure 5:
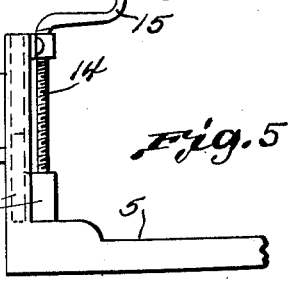
Figure 5 is a side elevational view of the elevating means for the forward end of the frame showing the axle member and wheels removed.

In certain districts large tracts of land are covered with brush in the form of small scraggy trees which grow very thickly together and are extremely difficult to eradicate, as they will not readily burn and to chop them is practically an impossible task.

The present invention has been devised particularly to cut down growth of this kind and it consists of a rigid frame 1, preferably a strong steel structure of a substantially triangular form, having a cross brace 2 arranged parallel with the side 3 and the apex of the side 3 and the sloping side 4 is joined in a platform 5. At the front end of this platform is arranged a vertical guide 6 in which is arranged a sliding block 7 provided with a horizontally extending pin 7'. Upon this pin is mounted a cross beam 8 to the outer ends of which are pivotally secured the knuckles 9 carrying the wheels 10.

The forwardly extending arms 11 of the knuckles 9 are connected by a cross bar 12 which is pivotally connected to a lever 13 having its inner end pivotally secured to the beam 8 centrally of its width. The outer end of the lever is adapted to carry the draught tongue.

A threaded shaft 14 is supported in the guide 6 and threaded in the block 7, being provided with a crank 15 at the top by means of which the shaft is rotated to raise and lower the block in the guide, thereby raising or lowering the frame in relation to the wheels.

A lateral extension 16 on the frame carries a guide 17 similar to the guide 6 with a threaded staff operating a block carrying the wheel 18.

A vertical guide 19 is arranged on the cross brace 2 and in this guide is a sliding block 20 upon which is mounted the wheel 21.

The block 20 is arranged to be operated with a rapid movement so that the outer corner of the frame may be raised or lowered very quickly and a link 22 is secured to the block 20 and to the lower end of this link is connected a crank 23 which is operated by the lever 24. The lever and its crank and consequently the block 20 are held in adjusted positions by means of a toothed quadrant 25 rigidly secured to the back end of the frame.

The side 4 of the frame is disposed in suitable angular relation to the line of travel of the machine and is provided with brackets 26 and 27 which carry the journals of the rotatable cutter 28. This cutter is tapering in form, being provided with removable knives 29 preferably formed in short lengths. By thus mounting the cutter on the angularly inclined side 4 of the frame the cutter blades will not meet with as abrupt opposition from the growths it encounters as would be the case if the cutter was journalled at right angles to the line of travel of the machine. Consequently by disposing the cutter in angular relation to the line of travel, the effective cutting width of a cutter of given length will be reduced, and the cutter blades thus advancing on the growths will not be called upon to cut directly therethrough but such cutting will be prolonged to a degree dependent on the angular disposition of the cutter. Such an arrangement is particularly desirable when exceptionally heavy growths are encountered.

A guard 30 extends upwardly from the frame side 4 and projects part way over the cutter. The top part of this guard is arranged slightly lower than the top of the cutting circle defined by the edges of the cutter blades and extends well in towards the cutter.

The cutter is driven at a very rapid speed by any suitable means but is here shown operated by a worm drive 31 operated by a suitable motor 32 arranged upon the platform 4 of the frame.

The cutter rotates in an upward direction on the outer side to cut upwardly against the brush and as the brush and small trees are cut through they are caught up by the rapidly revolving blades and thrown upwardly clear of the cutter, the guard 30 serving to prevent the brush and small trees thus thrown up by the cutter blades, from falling back against the downwardly rotating side of the cutter and becoming jammed between the cutter and the frame.

The tapered form of the cutter is an important feature as the larger diameter is arranged at the advance end so that the first cut made on a thick trunk of a tree is followed, as the machine moves forwardly, by a gradually reducing cut by reason of the angular disposition of the cutter and the fact that the cutter is tapered which effectively prevents the sticking or jamming of the cutter.

In operation, the machine is drawn either by horses or a tractor attached to the shaft lever 13 and according to the nature of the ground the inward or side of the frame may be adjusted to any desired height.

The outer or tail end of the frame may be raised and lowered rapidly by means of the lever 24 to suit the condition of the ground over which the machine is operated.

What I claim as my invention is:—

1. In a brush cutting machine, the combination with a frame mounted on wheeled supports and having one side inclined relative to the line of travel, of a rotatable cutter horizontally journalled on the inclined side of said frame and presenting horizontal cutting blades extending the full length thereof, and means independent of the traction means for rotating said cutter.

2. In a brush cutting machine, the combination with a rigid frame adjustably mounted on wheeled supports, one side thereof being inclined relative to the line of travel and having rigid journal bearings arranged at the front and rear ends of the inclined side, of a shaft mounted in said bearings and extending the full length of said inclined side, an engine mounted on said frame connected with said shaft, and a plurality of cutter blades mounted longitudinally of said shaft and extending from end to end thereof.

3. In a brush machine, the combination with a rigid frame adjustably mounted on wheeled supports and having one side inclined relative to the line of travel, of a horizontally arranged cutter journalled on the inclined side of said frame and extending throughout the length thereof, said cutter having its greatest diameter at the advance end and tapering gradually to the rear end, and means carried by the frame for rotating said cutter.

4. In a brush cutting machine, the combination with a rigid frame mounted on adjustable wheeled supports and having one side inclined relative to the line of travel, of a cutter journalled horizontally along the inclined side of the frame and extending from end to end thereof, and a rigid guide secured to the frame and extending above the top side of said cutter, and means for rotating said cutter.

WM. S. GOULET.